Aug. 28, 1945.  E. M. SPLAINE ET AL  2,383,572
LENS MOUNTING
Filed Feb. 1, 1943  2 Sheets—Sheet 1

INVENTORS
EDWARD M. SPLAINE
LAWRENCE A. SEVERY
BY Louis L. Gagnon
ATTORNEY

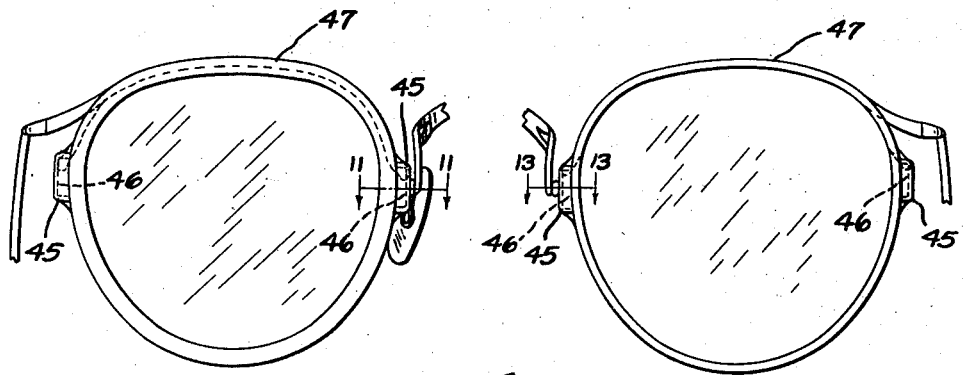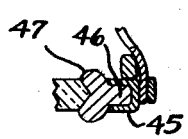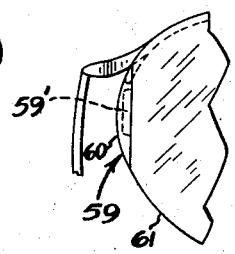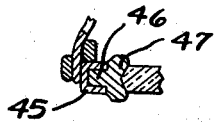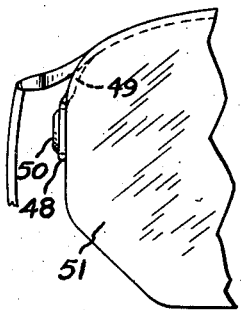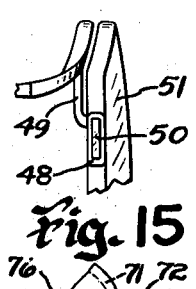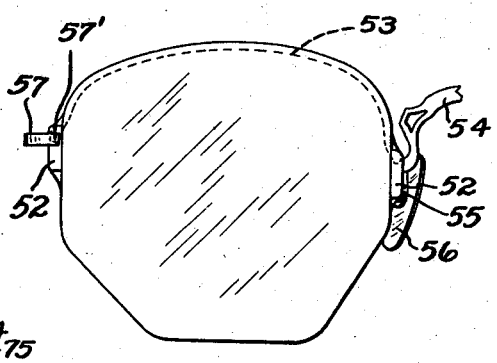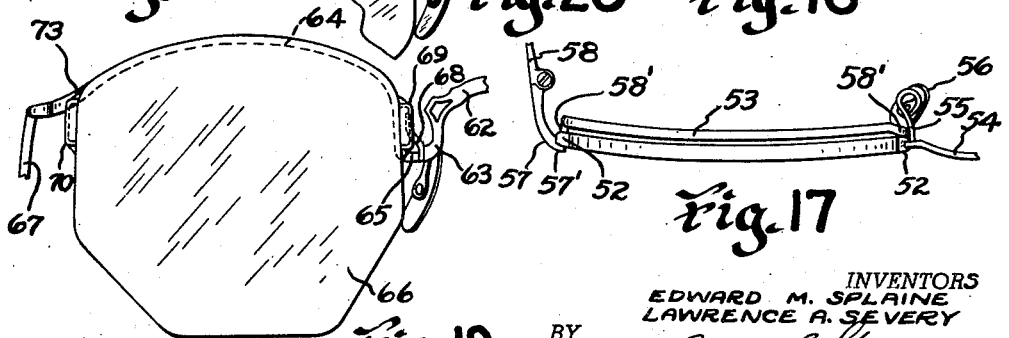

Patented Aug. 28, 1945

2,383,572

UNITED STATES PATENT OFFICE 2,383,572

LENS MOUNTING

Edward M. Splaine and Lawrence A. Severy, Southbridge, Mass., assignors to American Optical Company, Southbridge, Mass., a voluntary association of Massachusetts Application February 1, 1943, Serial No. 474,310

4 Claims. (Cl. 88—41)

This invention relates to improvements in ophthalmic mountings and relates particularly to novel lens supporting means.

One of the principal objects of the invention is to provide novel means and methods of connecting lenses with a lens supporting structure whereby a plurality of stock lenses and supporting structures may be provided and may be quickly and easily assembled with little or no alterations to the lens or supporting structure.

Another important object of the invention is to provide a lens supporting structure and lenses with connecting means which may be quickly and easily assembled for ready attachment and detachment of the lenses with said lens supporting structure.

Another object is to provide a lens supporting structure and lenses having connecting means with interfitting parts held in assembled relation with each other through a clamping action introduced by the lens supporting structure.

Another object is to provide lenses with protrusions on the nasal and temporal sides thereof adapted to function cooperatively with means shaped to receive and fit about said protrusions and adapted to be held in said relation through a clamping action introduced by a supporting frame connecting said means adapted to receive said protrusions.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims.

We, therefore, do not wish to be limited to the exact details of construction, arrangement of parts shown and described as the preferred forms only have been given by way of illustration.

Referring to the drawings:

Fig. 10 is a partial front view showing the mounting used with a plastic rimmed lens.

Fig. 11 is a sectional view taken on line 11—11 of Fig. 10.

Fig. 12 is a partial front view, showing the mounting used with a metal rimmed lens.

Fig. 13 is a sectional view taken on line 13—13 of Fig. 12.

Fig. 14 is a fragmentary front view of a modified form of the invention.

Fig. 15 is a fragmentary end view of the modified form shown in Fig. 14.

Fig. 16 is a front view of another modified form of the invention.

Fig. 17 is a top view of the modified form shown in Fig. 16.

Fig. 18 is fragmentary front view of another modified form of the invention.

Fig. 19 is a partial front view of another modified form of the invention.

Fig. 20 is a fragmentary front view of another modified form of the invention.

Figure 1:
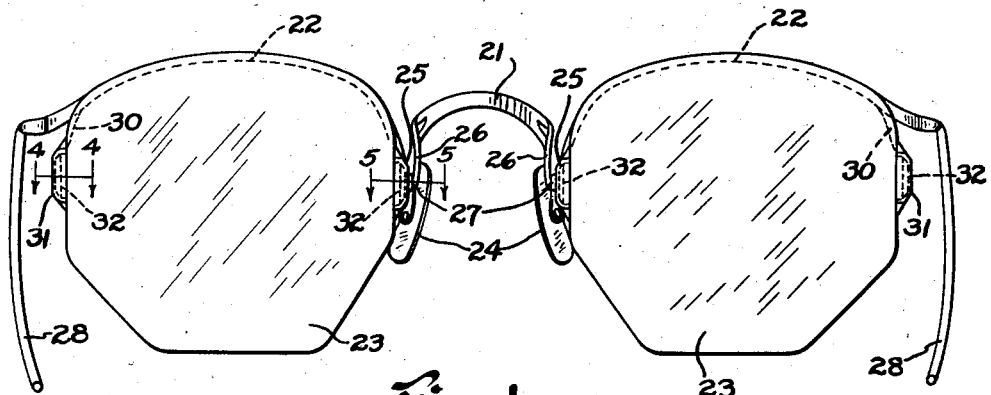
Fig. 1 is a front view of the mounting with the lenses assembled thereto.
Figure 2:
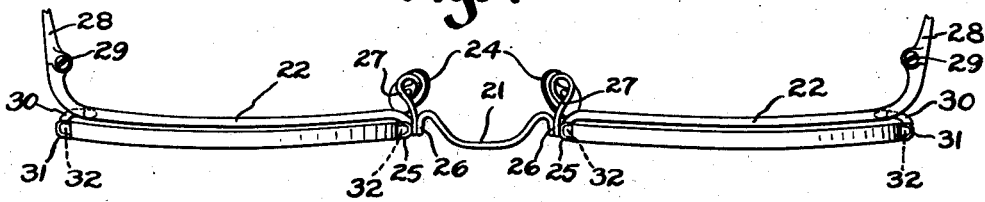
Fig. 2 is a top plan view of the mounting shown in Fig. 1.

The usual procedure in connecting lenses with the lens supporting structure of an ophthamic mounting, particularly in the ophthalmic mountings of the type embodying rimless lenses was to form connection openings in the lenses and to secure lens straps to the lenses having perforations aligned with the connection openings in the lenses and having means such as a screw, pin and tube or other connecting means extending through said aligned openings and perforations.

In other types of ophthalmic mountings the lenses were supported by lens rims in most instances having divided end portions requiring the use of detachable connecting means for securing said lugs together.

In other types of ophthalmic mountings, particularly mountings formed of non-metallic material, the said mountings were formed with continuous lens rims having an internal groove in which lenses were adapted to be placed and held by first heating and expanding the lens rims so as to receive the edge of the lens internally of the groove and to be thereafter held in said groove by allowing the expanded rims to contract and assume an intimate fit with the contour of the lenses.

With all of the above constructions extreme care had to be taken in sizing and fitting the lenses to the lens rims or lens straps and considerable time was required in assembling the lenses with the lens supporting means. When once assembled the said lenses and lens supporting structure were not readily detachable and great difficulty was therefore encountered in the ready removal and replacement of lenses.

The present invention is therefore directed to the provision of means whereby the lenses may be quickly and easily assembled with each other and may be quickly and easily detached for repairs or replacement.

Referring more particularly to the drawings wherein like characters of reference designate like parts throughout the several views, one of the devices embodying the invention, as shown in Figs. 1 through 6, comprises broadly a lens supporting structure having a bridge member 21, having depending side portions 26, long and slender temple supports 22, formed preferably of resilient material, nose bearing pads 24 and cup-like lens holding means 25 and 31.

The cup-like lens holding means 25 and 31 are adapted to engage protrusions 32 on the nasal and temporal sides of the lens 23.

The long and slender temple supports 22, as stated above, are preferably formed of resilient material but it is to be understood that only portions thereof may be formed resilient with other portions thereof relatively rigid and adjustable.

Figures 5, 8, 9:
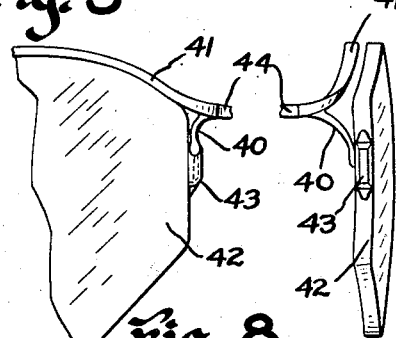
Fig. 5 is a sectional view taken on line 5—5 of Fig. 1.
Fig. 8 is a fragmentary rear view showing another modified form of the invention.
Fig. 9 is an end view of the modified form of the invention shown in Fig. 8.

The said long and slender temple supports, at the nasal ends thereof, are connected to the lens holding means 25 adjacent the depending portions 26 of the bridge 21 and adjacent the nose pad supporting arms 27, as shown in Fig. 5. Although the said temple supports are shown as being attached to the lens holding means it is to be understood that one side surface thereof may be attached to the rear of the lens holding means with another side surface thereof attached to the nose pad supporting arm or to the depending portion of the bridge or the said nasal ends of the temple supports may be attached only to the nose pad supporting arms 27 or depending portions 26 of the bridge. The said parts are preferably connected with each other as by soldering, welding or the like.

The temple supports 22 adjacent their temporal ends are provided with rearwardly extending portions to which temples 28 are pivotally connected by means of pins, screws or the like 29.

The said long and slender temple supports are shaped to follow substantially the upper contour shape of the lenses and although preferably located in the rear of the upper edges of the lenses, it is to be understood that they may be shaped to follow the edge of the lens in the plane of said lens or to lie in front of the plane of the lenses. The said temple supports, adjacent the temporal ends, are provided with depending resilient adjustable arms 30 secured adjacent the upper ends thereof to the long and slender temple supports as by soldering, welding or the like and secured adjacent the lower ends thereof to the cup-like lens holding means 31. In the above mentioned figures, the said depending arms 30 are preferably provided with a lower forwardly deflected end portion which is secured to the rear surface of the cup-like member preferably adjacent the upper end of said cup-like member as shown best in Fig. 3. The said arm 30 is secured to the cup-like member 31 as by soldering, welding or the like. The cup-like members 25 and 31, therefore, will be supported in spaced relation with each other by the long and slender temple supports 22 and by the depending resilient arms 30.

Figures 3, 4, 6, 7:
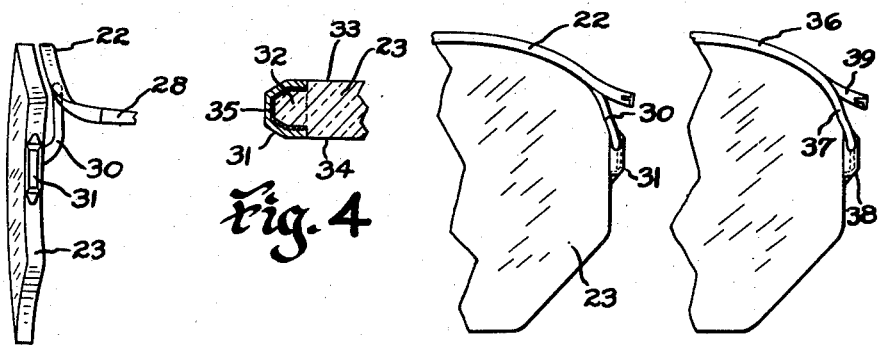
Fig. 3 is an end view of the mounting shown in Figs. 1 and 2.
Fig. 4 is a sectional view through the cap holding member, taken on line 4—4 of Fig. 1 and showing cushioning means between the cap and the lug of the lens.
Fig. 6 is a fragmentary rear view of the mounting.
Fig. 7 is a fragmentary rear view showing a modified form of the invention.

It is to be noted that the protrusions 32 are thinner than the adjacent thickness of the lenses and are formed substantially centrally of the edges thereof. The said protrusions also extend in a direction longitudinally of the edges an amount considerably greater than the thickness of the lenses and are also shaped substantially to the inner shape of the respective cup-like members 25 and 31 with said cup-like members and protrusions being so dimensioned that the brims of said cup-like members will seat themselves in intimate relation with the peripheral edges of the lenses adjacent the protrusions. As shown in Figure 4, the cup-like members have side surfaces in substantially flush relation with the opposed surfaces of the lenses. It is to be understood, however, that the said cup-like members may be of greater or of less width than the adjacent thickness of the lens depending upon the initial thickness of lens. The said cup-like members, however, are preferably provided with outer surfaces in flush relation with the surfaces of the lenses if possible. When the lens supporting structure and lenses are in detached relation with each other, the distance between the cup-like members is considerably less than the width of the lens so that when the said cup-like members are being connected with the protrusions on the lenses force is exerted to move the cup-like members outwardly against the resilient function of the temple supports 22 or depending portions 30 so as to permit the cup-like members to be positioned over said protrusions 32 and be held in intimate relation therewith and with the adjacent edges of the lenses by the clamping action of the temple supports and arms 30. It is to be understood that the temple supports 22 are initially shaped substantially to follow the shape of the upper contour edge of the lenses when the cup-like members are in position on the protrusions and are adapted to assume this shape when the lens supporting structure is in connected relation with the lenses. If an increased amount of resiliency is desired this may be obtained by bending the depending arms 30 inwardly without requiring altering of the shape of the long and slender temple supports 22.

If desired, the long and slender temple supports may be formed relatively rigid and adjustable and may be provided with resilient depending arms 30 for introducing the clamping action of the cup-like members 25 and 31 with the lenses.

The opposed sides of the lenses 23, as shown in Figures 1 through 6, are illustrated as being straight and in substantially parallel relation with each other and the line of the brim of the cup-like members 25 and 31 is illustrated as having relatively straight edges shaped to fit the edges of the lenses. It is to be understood, however, that if the edges of the lenses are curved, the edge line of the brim of the cup-like members will be similarly curved or otherwise shaped to the shape to which the opposed edges of the lenses are initially formed.

Instead of forming the rearwardly extending portion to which the temple is pivotally attached in integral relation with the long and slender temple support and forming the depending arm 30 separately thereof a construction such as shown in Figure 7 may be substituted therefor.

In this figure the long and slender temple support 36 has an integral portion 37 extending downwardly and following substantially the adjacent contour edge of the lens and terminating in an outwardly and forwardly extending portion secured to the rear surface of the cup-like member 38. In this instance the temple supporting portion 39 is formed separate of the long and slender support 36 and is provided with an inner end shaped to and secured to the long and slender temple support at a point thereon substantially in line with the portion thereof shaped to follow the upper contour shape of the lens and where the depending portion 37 deviates from said portion 36. The temple support 39 extends outwardly and rearwardly in a manner substantially the same as that of the temple supporting portion illustrated in Figures 1 and 2.

The cup-like members 25, 31 or 38, as the case may be, may be shaped to substantially intimately engage the protrusions 32 or may be provided with a relatively thin liner 35 of resilient yielding material such as plastic, rubber or other similar materials. This is to provide cushioning means throughout the inner contacting surfaces to aid in preventing chipping and to relieve said protrusions from strain introduced by shock during use.

The long and slender temple supports 36 may be formed of a greater diameter than the depending portions 37 with the said depending portions having a greater degree of resiliency than the temple supports 36.

The depending portions 30 may also be formed of less diameter than the portions 22 and possess a greater degree of resiliency.

By reason of the fact that the protrusions are relatively long in the direction of the edges of the lenses and that the cup-like members are similarly formed relatively long in said direction the lenses will be supported against possible rotation or tilting movement when the protrusions are in the secured relation with the cup-like members.

In the modified construction shown in Figs. 8 and 9, the adjustable arm 40, which simulates the arm 30, is attached to the long and slender temple support 41 adjacent the temple pivotal connection and extends inwardly, forwardly and downwardly from said attached end toward the periphery of the lens 42. A cup-like lens holding member 43 is secured adjacent the lower end of said arm. This construction provides a greater range of adjustment and readily permits the temple supporting end of the arm 41 to be raised or lowered by adjustment of the arm 40 as well as to be moved forwardly or rearwardly relative to the lens through adjustment of said arm.

It is to be understood that the arm 40 is also formed of resilient material.

In the above constructions the protrusions 32 are formed substantially intermediate the upper and lower ends of the sides of the lenses and in substantially diametrically opposed relation with each other.

In Figure 10 there is illustrated a modification of the invention wherein the lenses are supported within a continuous non-metallic lens rim 47 having protrusions 46 thereon adapted to fit and extend within the cup-like lens holding means carried by a metallic lens supporting frame similar to those illustrated in Figures 1 through 9. The non-metallic lens rim 47 is provided with an inner lens receiving groove. The lens in this instance is formed with a bevelled edge and is secured in the rim by heating and stretching the rim, placing the lens within the lens receiving groove and allowing the rim to cool and contract on the lens.

A similar construction is illustrated in Figure 12 wherein the rim is preferably formed of metal and provided with divided end portions secured in connected relation with each other by suitable lugs in a conventional manner or may be formed continuous as shown in Figure 12 in which instance the said rim may be heated and expanded to receive the lens and thereafter permitted to cool and contract on the lens. It is to be understood that the rims 47 are provided with protrusions 46 similar to those of Figure 10 with the said protrusions being formed integrally with the rims or formed separately thereof and secured to the rims as by soldering, welding or the like.

In Figures 14 and 15 there is illustrated a further modification which instead of forming the lens holding means to cup-like members, the said lens holding members are in the form of open ring-like members 48 adapted to embrace protrusions 50 formed integrally with the lenses 51 or protrusions of the type illustrated at 46 in Figures 10 and 12. It is quite apparent that the construction of Figures 14 and 15 may be used with any of the above described constructions.

Lens holding means of the nature of the said means 48 is used with a view to being less conspicuous without sacrifice of efficiency as to supporting the lenses during the use of the mounting. The said ring-like lens holding means 48 are carried by resilient arms 49 similar to the arms 30, 37 and 40 with the said arm being formed to any of the shapes of the above mentioned arms.

In Figures 16 and 17 there is illustrated a further modification wherein long and slender resilient bar-like members 53 are provided, said bar-like members 53 are secured adjacent the opposed ends thereof to cup-like lens holding means 52. In this construction, the bridge 54 is secured to the cup-like means 52, adjacent the nasal side of the lens and the nose pad supporting arm 55 which supports the nose pad 56 is also secured to said cup-like means 52. In this construction the long and slender temple supports are secured to the cup-like means 52 on the temporal sides of the lenses and are provided with a lip 57' shaped to overlie the front side surface of the cup-like means 52. The said temple support 57 extends rearwardly to a temple pivotal connection to which the temple 58 is pivotally attached. The said temple support 57 is secured to the cup-like means 52 by soldering, welding or the like. It is to be noted that the temple support 57 is secured adjacent the upper end of the member 52 whereby the said temple support is positioned above the line of straight ahead vision through the lenses when the mounting is in position of use on the face. The resilient member 53 has forwardly protruding ends 58 adapted to support the said member 53 in spaced relation with the adjacent surface of the lens. The resilient clamping action, therefore, is embodied by the resiliency of the member 53.

In Figure 18 there is illustrated a further modification wherein the cup-like lens holding means 59 is provided for receiving the protrusions 59' of the lens, the said lens being provided with a relatively vertical edge adjacent said protrusions. The cup-like member 59 is provided with an outer surface shaped substantially to blend with the contour line of the lens so as to produce a relatively continuous curved contour and is resiliently supported in the manner of the above mentioned cup-like members. It is to be understood that any of the above described constructions may be provided with the cup-like members 59 through suitable modifications of said constructions.

In Figure 19 there is illustrated a further modification wherein the cup-like lens holding means is adjacent the upper contour of the lens. This construction embodies a bridge 62 having depending side portions 63. The said depending side portions 63 adjacent the lower ends thereof are attached to an outwardly deflected end 65 on the long and slender temple support 64. The cup-like lens holding means 69 in this instance is connected to an adjustable bar-like member or arm 68 adjacent the upper end of said arm and the lower end of the arm is attached to the bridge adjacent the point of connection of said bridge with the outer deflected end 65. The said arm 68 provides means for adjustment of the cup-like member 69 and is preferably formed resilient. The long and slender temple support 64 is also formed resilient. The cup-like lens holding means 70, adjacent the temporal end of the long and slender temple support 64, is secured to an adjustable arm 73 which in turn is attached to the temple support adjacent the outer temporal end thereof. A suitable temple 67 is pivotally supported by the temple supporting end of the arm 64. The said arm 73 also provides means of adjustment of the cup-like member 70 and is preferably formed resilient.

In Figure 20 there is illustrated a further modification wherein the long and slender temple support 71 is secured to the cup-like member 72 adjacent the upper end thereof and the bridge 74 is connected with the cup-like member 72 by an adjustable arm 75. This provides means for altering the distance between the lenses without altering the adjusted relation of the long and slender temple supports with the lens. It is to be understood that the lens 76 is provided with a protrusion similar to the above lenses which is adapted to fit within the cup-like member 72.

From the foregoing description it will be seen that simple, efficient and economical means have been provided for accomplishing all the objects and advantages of the invention.

Having described our invention, we claim:

1. A lens supporting structure for supporting the lenses of an ophthalmic mounting, said lenses having substantially parallel edge surfaces on the nasal and temporal sides thereof with each of said surfaces having a protrusion thereon, said lens supporting structure comprising a bridge member, relatively long and slender bar-like portions extending outwardly of the opposite sides of said bridge member and shaped to follow substantially the upper contour shape of the lenses and each terminating in a portion extending outwardly and rearwardly of said lenses to a temporal end to which a temple is pivotally connected when the supporting structure is assembled with said lenses, lens holding means secured to the lens supporting structure adjacent the opposed sides of the bridge member and disposed in the direction of the adjacent edges of the lenses, said lens holding means having a recessed portion adapted to receive the respective protrusions on the nasal sides of the lenses and to assume a relatively intimate fit about the contour of said protrusions, said long and slender bar-like portions each having a depending resilient adjustable arm portion extending downwardly from adjacent the temporal end thereof with the lower end of each of said depending adjustable arm portions having lens holding means thereon, said lens holding means extending in the direction of the adjacent edges of the lenses and having a recessed portion adapted to receive the protrusions on the temporal sides of said lenses and being adapted to assume a relatively intimate fit with the contours of said protrusions, said lens holding means, when in assembled relation with the lenses, being in substantially parallel relation with each other and each having surface portions adapted to engage the adjacent side surfaces of the lenses.

2. A lens supporting structure for supporting the lenses of an ophthalmic mounting, said lenses having substantially parallel edge surfaces on the nasal and temporal sides thereof with each of said surfaces having a protrusion thereon, said lens supporting structure comprising a bridge member, relatively long and slender bar-like portions extending outwardly of the opposite sides of said bridge member and shaped to follow substantially the upper contour shape of the lenses and each extending continuously outwardly and rearwardly of said lenses to a temporal end to which a temple is pivotally connected when the supporting structure is assembled with the lenses, cup-like lens holding means secured to the lens supporting structure adjacent the opposed sides of the bridge member with the longest dimensions thereof disposed in the direction of the adjacent edges of the lenses, said cup-like lens holding means being adapted to receive the respective protrusions on the nasal sides of the lenses and to assume a relatively intimate fit about the contour of said protrusions, said long and slender bar-like portions each having a depending resilient adjustable arm portion secured to the under side thereof and extending downwardly from adjacent their temporal end with the lower end of each of said depending adjustable arm portions having cup-like lens holding means thereon, the longest dimension of said cup-like lens holding means extending in the direction of the adjacent edges of the lenses and adapted to receive the protrusions on the temporal sides of said lenses and being adapted to assume a relatively intimate fit with the contours of said protrusions, said cup-like lens holding means, when in assembled relation with the lenses, being in substantially parallel relation with each other and each having a surface portion adapted to engage the adjacent side surfaces of the lenses.

3. An ophthalmic mounting comprising a pair of lenses having substantially parallel edge surfaces on the nasal and temporal sides thereof with each of said surfaces having a protrusion thereon and a lens supporting structure for said lenses, said lens supporting structure comprising a bridge member, relatively long and slender bar-like portions extending outwardly of the opposite sides of said bridge member and shaped to follow substantially the upper contour shape of the lenses and each terminating in a portion extending outwardly and rearwardly of said lenses to a temporal end to which a temple is pivotally connected, lens holding means secured to the lens supporting structure adjacent the opposed sides of the bridge member and disposed in the direction of the adjacent edges of the lenses, said lens holding means each having a recessed portion receiving the respective protrusions on the nasal sides of the lenses and having a relatively intimate fit about the contour of said protrusions, said long and slender bar-like portions each having a depending resilient adjustable arm portion extending downwardly from adjacent the temporal end thereof with the lower end of each of said depending adjustable arm portions having lens holding means thereon, said lens holding means extending in the direction of the adjacent edges of the lenses and having a recessed portion receiving the protrusions on the temporal sides of said lenses and having a relatively intimate fit with the contours of said protrusions, said lens holding means being in substantially parallel relation with each other and each having surface portions engaging the adjacent side surfaces of the lenses.

4. An ophthalmic mounting comprising a pair of lenses having substantially parallel edge surfaces on the nasal and temporal sides thereof with each of said surfaces having a protrusion thereon and a lens supporting structure for said lenses, said lens supporting structure comprising a bridge member, relatively long and slender bar-like portions extending outwardly of the opposite sides of said bridge member and shaped to follow substantially the upper contour shape of the lenses and each extending continuously outwardly and rearwardly of said lenses to a temporal end to which a temple is pivotally connected, cup-like lens holding secured to the lens supporting structure adjacent the opposed sides of the bridge member with the longest dimensions thereof disposed in the direction of the adjacent edges of the lenses, said cup-like lens holding means fitting over the respective protrusions on the nasal sides of the lenses and having a relatively intimate fit about the contour of said protrusions, said long and slender bar-like portions each having a depending resilient adjustable arm portion secured to the under side thereof and extending downwardly from adjacent their temporal end with the lower end of each of said depending adjustable arm portions having cup-like lens holding means thereon, the longest dimension of said cup-like lens holding means extending in the direction of the adjacent edges of the lenses and receiving the protrusions on the temporal sides of said lenses and having a relatively intimate fit with the contours of said protrusions, said cup-like lens holding means being in substantially parallel relation with each other and each having a surface portion engaging the adjacent side surfaces of the lenses.

EDWARD M. SPLAINE.
LAWRENCE A. SEVERY.